(12) United States Patent
Womack et al.

(10) Patent No.: US 6,314,212 B1
(45) Date of Patent: Nov. 6, 2001

(54) HIGH PRECISION OPTICAL METROLOGY USING FREQUENCY DOMAIN INTERPOLATION

(75) Inventors: Kenneth Howard Womack, San Diego; Daniel Lee Abraham, Irvine, both of CA (US)

(73) Assignee: Veeco Instruments Inc., Plainview, NY (US)

(*) Notice: Subject to any disclaimer, the term of this patent is extended or adjusted under 35 U.S.C. 154(b) by 0 days.

(21) Appl. No.: 09/260,599

(22) Filed: Mar. 2, 1999

(51) Int. Cl.[7] ........................................ G06K 9/36
(52) U.S. Cl. ................................ 382/286; 250/559.19
(58) Field of Search ........................ 382/286, 280, 382/145, 147; 702/155, 156, 158; 250/559.19, 559.26; 356/372, 382

(56) References Cited

U.S. PATENT DOCUMENTS

| | | | |
|---|---|---|---|
| 4,835,402 | 5/1989 | Guillaume | 250/560 |
| 5,260,558 | 11/1993 | Goltsos | 250/205 |
| 5,633,714 | 5/1997 | Nyyssonen | 250/205 |
| 5,955,654 * | 9/1999 | Stover et al. | 73/1.89 |

OTHER PUBLICATIONS

Integrated Circuit Metrology II, SPIE Proceedings vol. 480 (1984), pp. 29–77.
Microelectronic Engineering, vol. 5 (1986), pp. 563–580.
Guillaume M.E. et al., Microelectronic Engineering, vol. 6 (1987), pp. 631–636.
Guillaume M.E. et al., Microelectronic Engineering, vol. 3 (1985), pp. 211–218.
Optical Microlithography IV, SPIE Proceedings vol. 538 (1985), pp. 172–186.

* cited by examiner

*Primary Examiner*—Yon J. Couso
(74) *Attorney, Agent, or Firm*—Nilles & Nilles, S.C.

(57) ABSTRACT

The present invention provides a method and apparatus for high precision image metrology. A feature dimension from the image is determined by measuring corresponding features in the Fourier power spectrum of the image with substantially improved precision due to immunity from noise and system response. Operationally, a digital image of the sample is acquired at sufficient resolution to capture the feature of interest. A sample widow is chosen which substantially isolates the feature of interest. The feature window is then piecewise extended to a predetermined window size for effective Fourier Transform interpolation. A Fourier Power Spectrum of the sample widow is generated at high sample density such that the loci of extremal points indicative of a feature dimension is identified with high precision. The relative spacing of the extremal points is measured and related to the desired feature dimension. Utilizing the power spectrum of the image feature in the manner herein disclosed advantageously provides a way to measure feature dimensions with high precision. The method of the present invention is substantially independent of variations in image system performance, typical system noise and sample optical properties.

20 Claims, 7 Drawing Sheets

HIGH PRECISION OPTICAL METROLOGY USING FREQUENCY DOMAIN INTERPOLATION

FIELD OF THE INVENTION

The present invention relates generally to the field of optical metrology and more specifically to high accuracy optical metrology of microscopic surface features.

BACKGROUND OF THE INVENTION

Magnetic data storage continues to be the primary, high-performance storage technology in terms of capacity, speed, cost and bytes shipped per year. The success of magnetic storage technology originates from a consistent series of enhancements in capacity and performance combined with significant reductions in price per megabyte. A major technical achievement that has enabled both the rise in storage density and the reduction in storage cost is the magnetic head design and performance. Magnetic storage heads typically comprise transducers for recording and reading localized "bits" on a magnetic medium such as a rotating disk or tape. Head technologies have evolved from ferrite, through thin film inductive to magnetoresistive and giant-magnetoresistive. Successive generations of head technology have enabled a continuous rise in storage density through higher performance and reduced head dimensions. For example, the storage capacity of a hard disk drive is critically dependent upon pole tip dimensions of the write transducer. Contemporary head designs typically have pole tip dimensions on the micron-scale.

In support of these advancements, new manufacturing processes have been developed which are capable of mass producing complex head designs with yields high enough to insure profitability. Magnetic recording heads are manufactured using processes and techniques adapted from integrated device fabrication. Deposition, lithography and etch processes are performed on AlTiC ceramic wafers to form an array of thin film read/write transducers. Wafers are then sliced into bars, whereupon the air bearing surfaces are formed by precision machining and lapping.

Finally, the bars are cut into individual sliders comprising an air-bearing surface and the magnetic head. In this regard, component inspection and testing plays a crucial role in understanding, implementing and controlling advanced process requirements and tolerances. However, even the best processes today cannot produce heads with 100% yield, and therefore it is necessary to inspect magnetic recording heads prior to drive assembly. In particular it is necessary to inspect each head for defects, damage and dimensional conformity before they are attached to a suspension and subsequently integrated into the disk drive assembly.

Optical inspection of recording head surfaces and read/write transducers must be capable of accommodating a variety of structural and material properties. Air bearing surfaces are complex 3-dimensional structures fabricated from granular ceramic composites while head read/write transducers are micron-size metal/insulator structures. For such applications, optical head inspection systems typically comprise semi-automated microscopes that require a human operator to visually detect and classify defective heads and often to operate the microscope itself. Over one billion heads per year are fabricated and inspected in this fashion.

One important aspect of head inspection comprises high-resolution metrology of head structures. Typically head metrology is carried out by imaging the head transducers using a microscope of known magnification and measuring the features of interest. Such methods have sufficient accuracy for larger head structures and indeed are well suited for production inspection because of its high-throughput. However, as head dimensions shrink, noise, systematic errors and limitations of optical imaging become increasingly problematic. Alternatively, it is possible to measure sub-micron head structures using SEM or atomic force microscopes; however, these techniques tend to be too slow and expensive for 100% inspection. Thus, as feature size continues to decrease, the need for precise optical measurement capability increases. Clearly it would be highly desirable to conduct head metrology by optical means in a completely automated manner.

SUMMARY OF THE INVENTION

It is a principal object of the present invention to provide a method and apparatus for performing high precision metrology. In accordance with the present invention, image features are measured by calculating a Fourier power spectrum of an appropriately chosen sample. Cusps in the power spectra are identified and their spatial frequencies measured. The spatial frequency intervals between cusps are inversely related the desired image dimension. In a preferred embodiment of the present invention, the sample window is chosen large enough to produce a high density of sample points in the corresponding power spectrum. The sample is preferably chosen such that only the image feature of interest contributes to the power spectrum, thereby enhancing signal-to-noise power. Utilizing the power spectrum in the manner herein disclosed advantageously provides a way to measure feature dimensions with high precision. The method of the present invention is substantially independent of variations in image system performance, typical system noise and sample optical properties. Further objects and advantages of the present invention will become apparent upon consideration of the following detailed description and accompanying drawings.

DETAILED DESCRIPTION OF THE PREFERRED EMBODIMENTS

Figure 1:
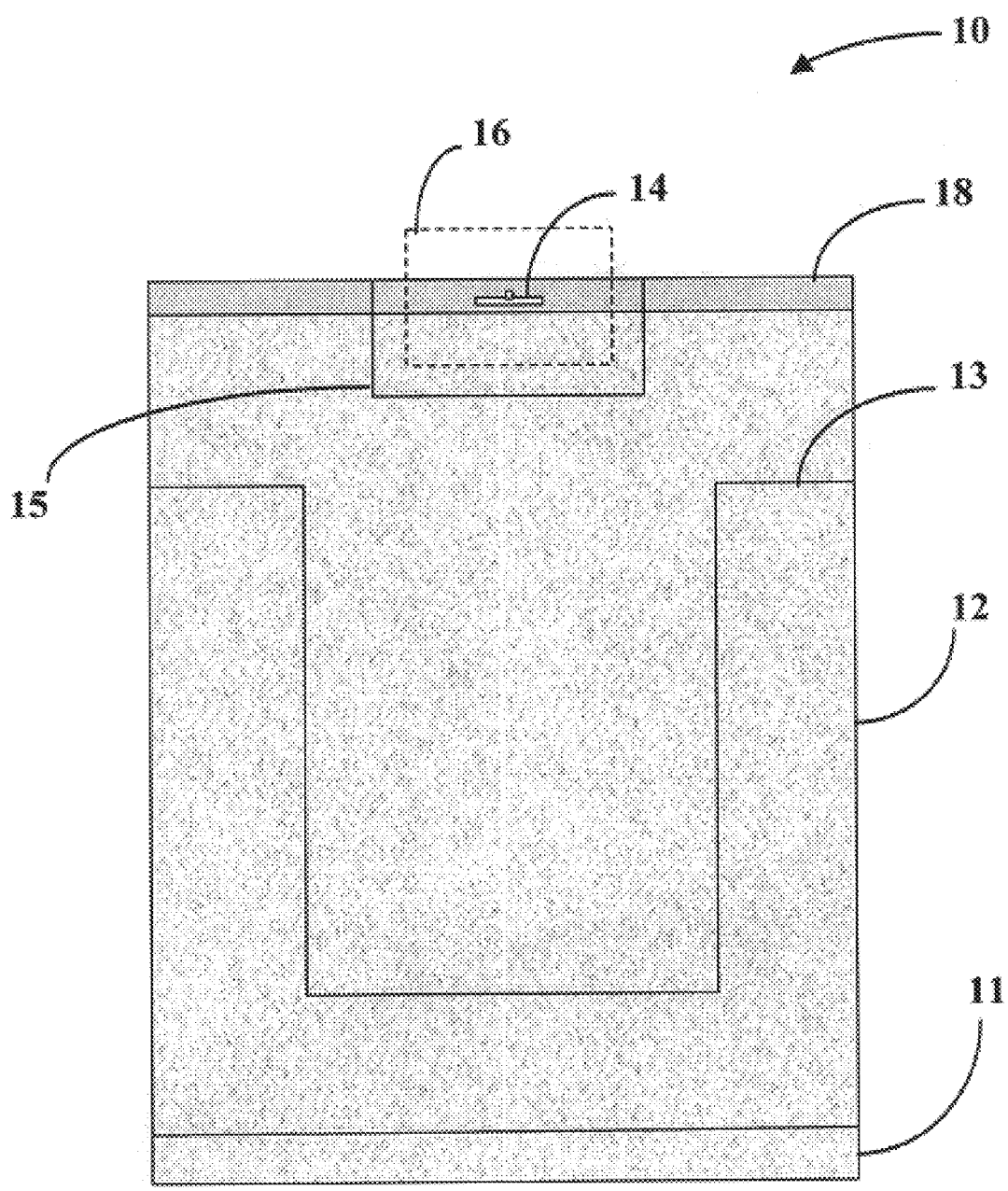
FIG. 1 is a plan view of a representative air bearing surface and magnetic recording head.

Optical metrology of magnetic recording heads continues to be the subject of intense development particularly as recording head features decrease to the micron scale. As shown in the plan view of FIG. 1, a representative slider 10 commonly used in a Hard Disk Drive (HDD) comprises an air bearing surface 12 and a head structure 14. The air bearing surface 12 is typically made from a conductive ceramic composite such as AlTiC. Special topographic features 11, 13, 15 are fabricated into the AlTiC that allow the slider to "fly" a small distance above a rotating disk surface, supported by the air boundary layer of the rotating surface. In order for the slider to fly at the desired height, the slider topography must meet specific design criteria, such as the dimensional tolerances of the topographic features 11, 13, 15. Since these features are relatively large, on the order of several hundred microns, it is typically the case that they are inspected and measured by optical means, such as an optical microscope.

Figure 2:
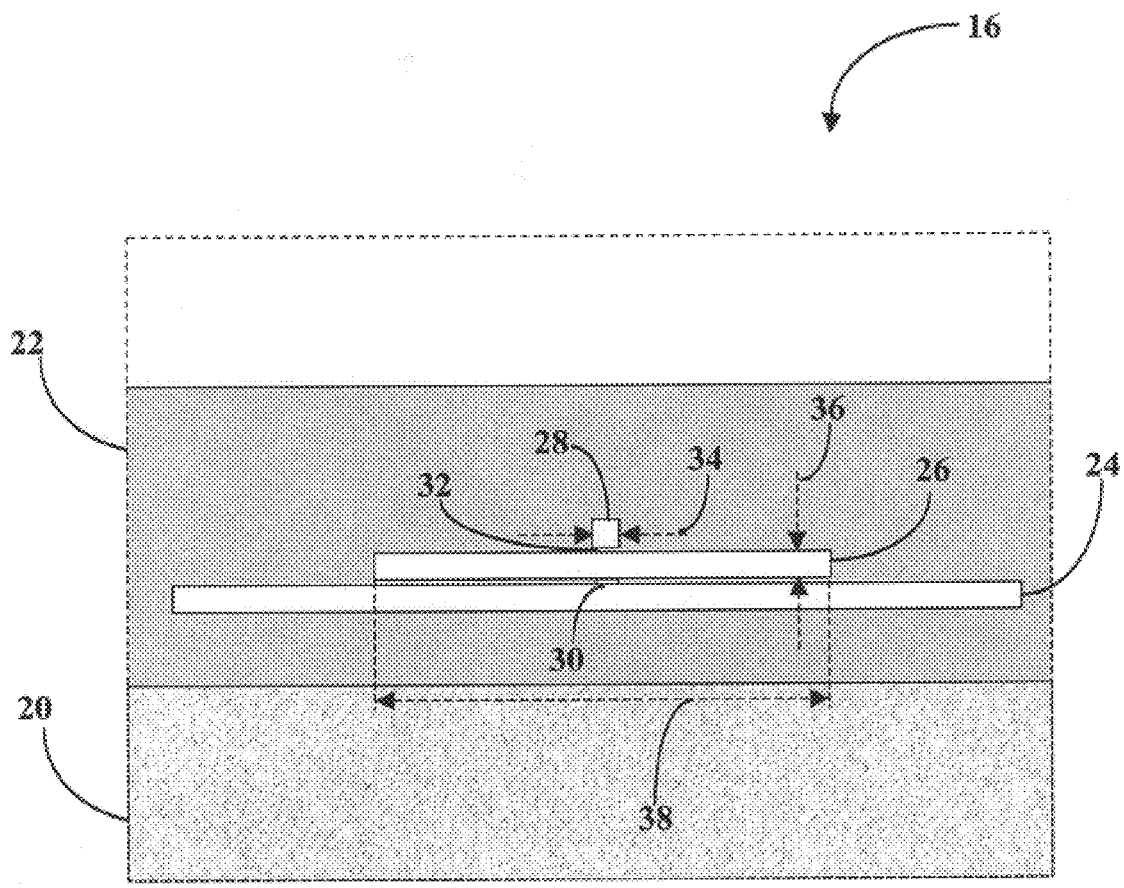
FIG. 2 is an exploded view of the magnetic recording head of FIG. 1.

The head structure 14 is fabricated as an integrated device typically using a variety of metallic magnetic materials and insulating materials such as alumina 18. In order to achieve high recording density, the head structure 14 should be small, typically about tens of microns. FIG. 2 shows an exploded view of the region 16 including the head structure 14. As shown in FIG. 2, the exploded view of region 16 comprises a ceramic portion of the air bearing surface 20 and an insulating portion 22. Embedded in the insulating portion 22 are major components of the head structure 14, comprising a magnetic shield 24, a first pole tip of a magnetic write transducer 26, a second pole tip of the magnetic write transducer 28, a write gap region 30 and a magnetic read transducer 32. The first and second pole tips 26, 28 are commonly referred to as P 1 and P2 respectively. In order for the magnetic read/write transducers to function at the desired speed, signal level and data density, the head structure components 24, 26, 28, 30 and 32 should meet specific design criteria, such as their dimensional tolerances. Critical dimensions pertaining to head manufacturing and functionality may for example be the width 36 and length 38 of P1 26, the length of the gap 32, the width of the read transducer 30 and the width 34 of P2 28. Of particular importance is the width 34 of P2 28 (herein referred to as P2w), because it is a major factor influencing the achievable track density in magnetic recording. Measuring P2w not only provides information for controlling manufacturing process variations, but also for grading the final product. For high-density magnetic recording systems, P2w is generally small, currently on the order of 1 micron. Future head designs will call for P2w to be substantially less than a micron, making optical metrology of such features even more demanding.

Figure 3:
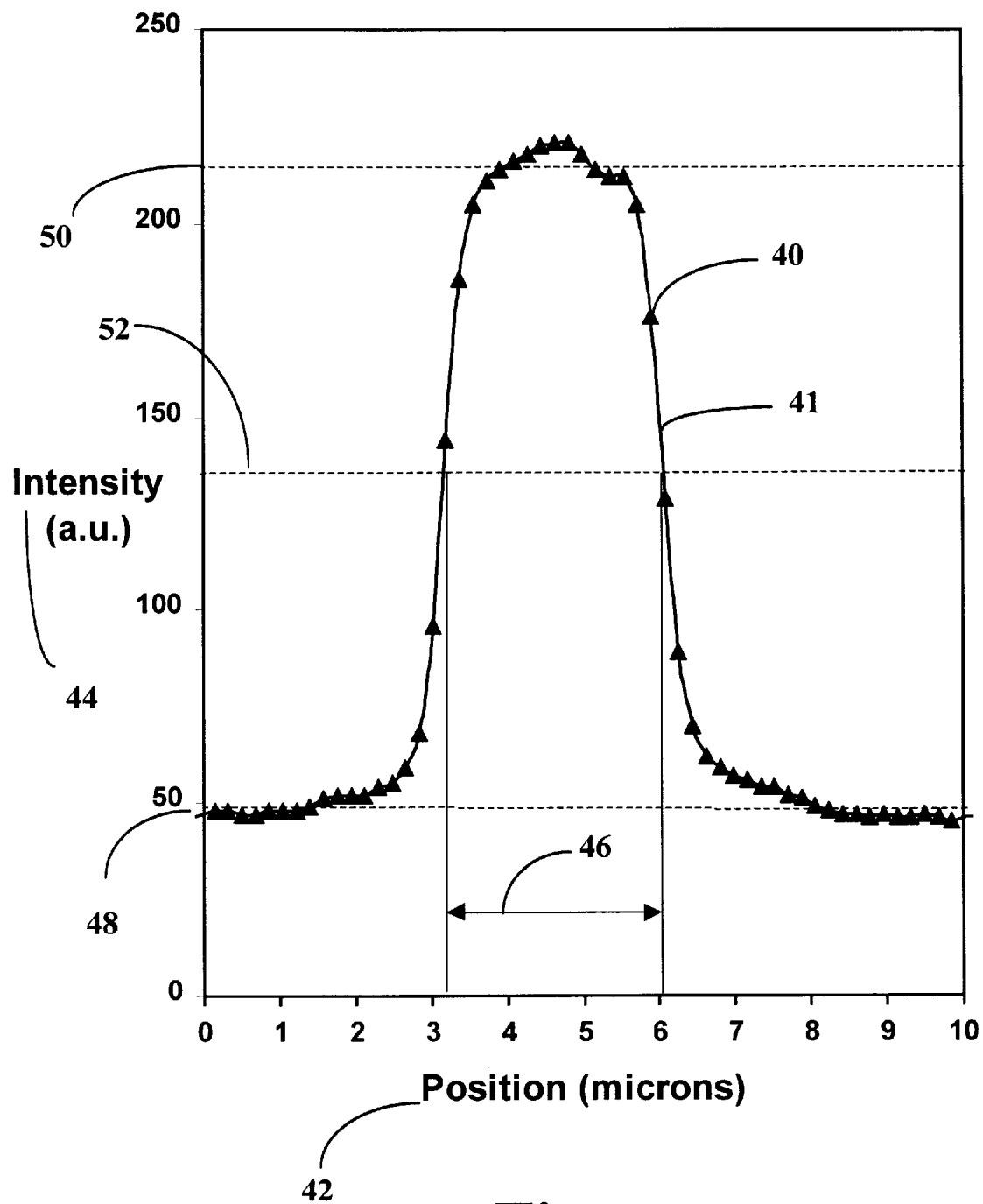
FIG. 3 is a schematic dimensional measurement of the prior art.

Optical metrology of head structures is typically carried out by imaging the head transducers using a microscope of known magnification and measuring the features of interest. For example, an image may be generated by a microscope operating in a brightfield mode thereby generating a two dimensional intensity distribution representing the head structure. As is commonly done, the microscope image may be recorded by a Camera, such as a CCD camera, then digitized and stored as a two-dimensional digital image. The head dimensions are inferred from dimensional measurements made on the digital image, for example as a cross-section of the image of P2 28 defined herein by the arrows 34. As shown in FIG. 3, the data 40 represents a cross-section of a digital image of P2 illustrating the intensity 44 as a function of position 42. The image intensity 48 is relatively low in the alumina region 22 and rises to a level 50 representative of P2. As with all imaging systems, finite resolution and noise limits the precision of image measurements. In particular, edges that define the boundaries of image features such as P2 28 will have an uncertainty in position determined by the imaging system resolution and noise. Thus, as shown by the data 40, the transition from P2 28 to the surrounding alumina 22 is represented by several data points. Conventionally, a threshold technique is employed to determine the edge position of a feature, whereby the threshold defines the signal level at which the actual edge occurs. The threshold may for example be an average of the intensities 48 and 50 of the alumina and P2 respectively as further represented by the intensity 52. The distance 46 between the two thresholds represents a measure of P2w. For greater precision, it is common to perform an interpolation between the data points 40 yielding the continuous curve 41, thereby gaining sub-pixel precision. However, as will be appreciated by those skilled in the art, determination of P2w by this general method is subject to limitations imposed by the finite optical resolution of the imaging system as well as system noise. For example, there are uncertainties in defining the intensities 48 and 50 due to image noise and uncertainties in determining the threshold 52 due to the finite optical resolution. More generally, such distance measurements taken over a one-dimensional cross section of an image utilize a relatively small part of the available information, as seen by the small number of data points comprising the cross-section in FIG. 3. Further complications are variations in imaging system performance, partial coherence of the illumination and variations in the optical properties of the sample.

In accordance with the basic principles of the present invention, more precise metrology of image features is achieved by analyzing a Fourier Power Spectrum (FPS) of the image feature. The Fourier Power Spectrum of a function g(x) representing an image feature is herein defined as:

$$FPS\{f,g(x)\}=\Im\{f,g(x)\}\cdot\Im\{f,g(x)\}^{*}=G(f) \quad (1)$$

where $\Im$ is the Fourier Transformation, "*" is a complex conjugation and $f$ is the image spatial frequency scaled by the sample window. A feature dimension from the image is determined by measuring corresponding features in the FPS with substantially improved precision due to immunity from noise and system response. Operationally, a digital image of the sample is acquired at sufficient resolution to capture the feature of interest. A sample widow is chosen which substantially isolates the feature of interest. The feature window is then piecewise extended to a predetermined window size for effective Fourier Transform interpolation. A Fourier Power Spectrum of the sample widow is generated at high sample density such that the loci of extremal points indicative of a feature dimension is identified with high precision. The relative spacing of the extremal points is measured and related to the desired feature dimension. Utilizing the FPS of the feature image in the manner herein disclosed advantageously provides a way to measure feature dimensions with high precision. The method of the present invention is substantially independent of variations in image system performance, typical system noise and sample optical properties.

As a basic description of the operating principles present invention, consider an idealized one-dimensional pole tip image represented by the image function i(x). The image function i(x) may be described as a convolution of an object function o(x) with the spatial impulse response or point-spread-function h(x) of an imaging system:

$$i(x)=\int o(x')\cdot h(x-x')dx'+n(x)=o(x)^{*}h(x)+n(x) \quad (2)$$

where "*" represents the convolution operator and n(x) is an additive uncorrelated noise term. For the particular case of an optical image of a head structures 14, the object function o(x) represents the irradiance distribution from the pole tip 28 and is modeled here as a rectangular aperture having a width w:

$$o(x) = I_0 rect\left(\frac{x}{w}\right), \text{ and } \begin{array}{l} rect(\xi) = 1 \text{ for } |\xi| \le \frac{1}{2} \\ = 0 \text{ otherwise} \end{array} \quad (3)$$

$I_0$ incorporates the relative reflectance of the pole tip with respect to the surrounding alumina. The FPS of $I(x)$ is $I(f)$, and is given by:

$$\begin{aligned} I(f) &= FPS\{o(x) * h(x) + n(x)\} = H(f) \cdot O(f) + N(f) \quad (4) \\ &= I_0^2 H(f) \cdot FPS\left\{f, rect\left(\frac{x}{2}\right)\right\} + N(f) \\ &= I_0^2 H(f) w^2 sinc^2(fw) + N(f) \\ &= I_0^2 H(f) \left(\frac{sin(\pi fw)}{\pi f}\right)^2 + N(f) \end{aligned}$$

where $H(f)$ is the FPS of the impulse response function $h(x)$, $O(f)$ is the FPS of the object function $o(x)$ and $N(f)$ is the noise power spectrum. The function $sin^2(\pi fw)$ has zeros or cusps at periodic values of $f=k/w$, where k is a non-zero integer. Thus, a determination of these cusp positions provides an effective measure of the feature width, w:

$$w = \frac{|k_1 - k_2|}{|f_1 - f_2|} \quad (5)$$

where $k_{1,2}$ and $f_{1,2}$ are integers and spatial frequencies corresponding to a pair of extremal points of the function $I(f)$.

It will be appreciated by those skilled in the art that under preferred imaging conditions, the influence of the optical properties, through $I_0$, and the imaging system, through $h(x)$, are largely attenuated in the determination of w in accordance with the principles of the present invention. In particular, by prior art methods as previously described in connection with FIG. 3, image contrast plays an important role in determining the proper thresholds for direct image metrology. Whereas by the present invention, image contrast, as it is manifest through the factor $I_0$, has substantially less influence in determining the cusp positions of $I(f)$. Furthermore, limitations in image resolution, as manifest in the impulse response $h(x)$, are also factored out and have significantly less influence in determining the cusps of $I(f)$ in comparison to edge detection of direct image metrology. In accordance with a preferred embodiment of the present invention, the image forming system preferably has an impulse response function $h(x)$ such that $H(f)$ is non-zero and monotonic over the range of spatial frequencies of interest. In an optical microscope arrangement, $H(f)$ is the square of the modulation transfer function. Such an impulse response can be achieved by operating under broad band illumination, such as white light, and by using a large illumination aperture to minimize partial coherence. It is furthermore preferred that the object feature to be imaged lies in the focal plane of the microscope. In practice there is always a degree of additive noise that shifts the cusp positions from zero as represented herein by the noise power $N(f)$. Nevertheless, in accordance with the preferred embodiments of the present invention, the cusp positions are highly localized and are thus substantially immune to typical noise sources such as uncorrelated additive white or Gaussian noise.

As mentioned previously, an image forming system for metrology typically also employs some means of image acquisition and display. For example, an image is typically sampled by a CCD camera having a 2-dimensional array of pixel elements. In accordance with another preferred embodiment of the present invention, the image should be sampled at a spatial frequency at least twice that of the highest spatial frequency of interest. More preferably, in a diffraction-limited optical system, the image sampling frequency $f_s$ should exceed twice the image cutoff frequency $$f_s \ge \frac{2f_c}{m},$$

where $f_s$ is the image system cutoff spatial frequency and m is the system magnification. It is also preferable to sample each image pixel with at least 8-bits or 256 intensity levels, and more preferably with 10 or 12 bit sampling. Thus in accordance with the principles of the present invention, as much of the harmonic content of the image is faithfully reproduced to allow a maximum number of extremal points in the FPS of the feature of interest. The FPS itself may be calculated by any algorithm that performs a Discrete Fourier Transformation of the digital image. Those skilled in the art of digital image processing will appreciate that Fast Fourier Transformation (FFT) algorithms are well suited for the present invention. The square of the amplitude or modulus of the resulting FFT data forms the desired FPS.

In accordance with another aspect of the present invention, a sampling widow is chosen from the digital image that advantageously provides for the calculation of the FPS of the feature of interest. If the sampling window comprises N elements at a sample density p (#pixels/unit length), then $I(f)$ will comprise N/2 independent spatial frequency components at a density proportional to N. Thus, the measured feature width, $$w = \frac{N}{p} \frac{|k_1 - k_2|}{|f_1 - f_2|},$$

can be determined in the spatial frequency domain at very high sample density by choosing a large enough sampling window. The uncertainty $\delta w$ in determining w depends upon how accurately the cusps in $I(f)$ can be determined. The relative uncertainty $\delta w/w$ is now limited by the relative uncertainty $\delta f/f$ in determining the cusps of $I(f)$ rather than the uncertainty in edge detection. Thus, it will be appreciated that having many samples between cusps reduces the relative uncertainty in measuring w. In a preferred embodiment of the present invention, the number of samples between cusps of $I(f)$, should be greater than the number of pixels nw spanning the feature of interest, $|f_1 - f_2| \ge n_w$. Thus in accordance with the present preferred embodiment, the window should preferably span at least $n_w^2$ pixels. For example, if an image of P2 spans approximately 15 pixels, then a window of at least 256 pixels will provide a more precise frequency domain interpolation than an interpolation of the direct image. Thus, in accordance with the present preferred embodiment, the sample window preferably spans at least the square of the dimension to be measured.

As disclosed above, it is preferable to utilize an FFT algorithm for calculating the FPS of the constructed sample window. A one-dimensional FFT calculation is preferable if the feature data forms a one-dimensional array or if variations in a dimensional measurement are of interest. If a single average dimensional value is desired, then it is preferable to calculate a two-dimensional FFT over a predetermined range of the feature image. A cross-section of the two-dimensional FFT along a feature axis will then provide an average over the predetermined feature range.

Figure 4:
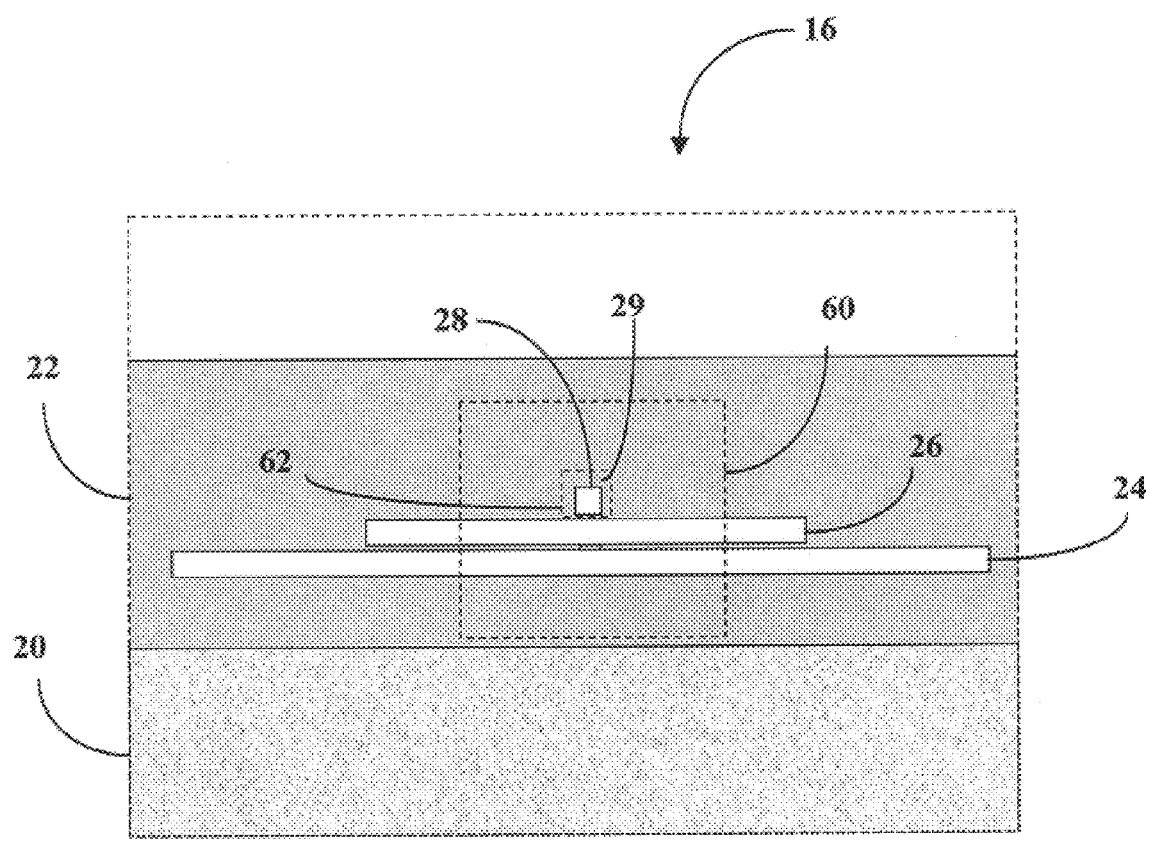
FIG. 4 is the exploded view of FIG. 2 showing preferred sample windows
Figure 5:
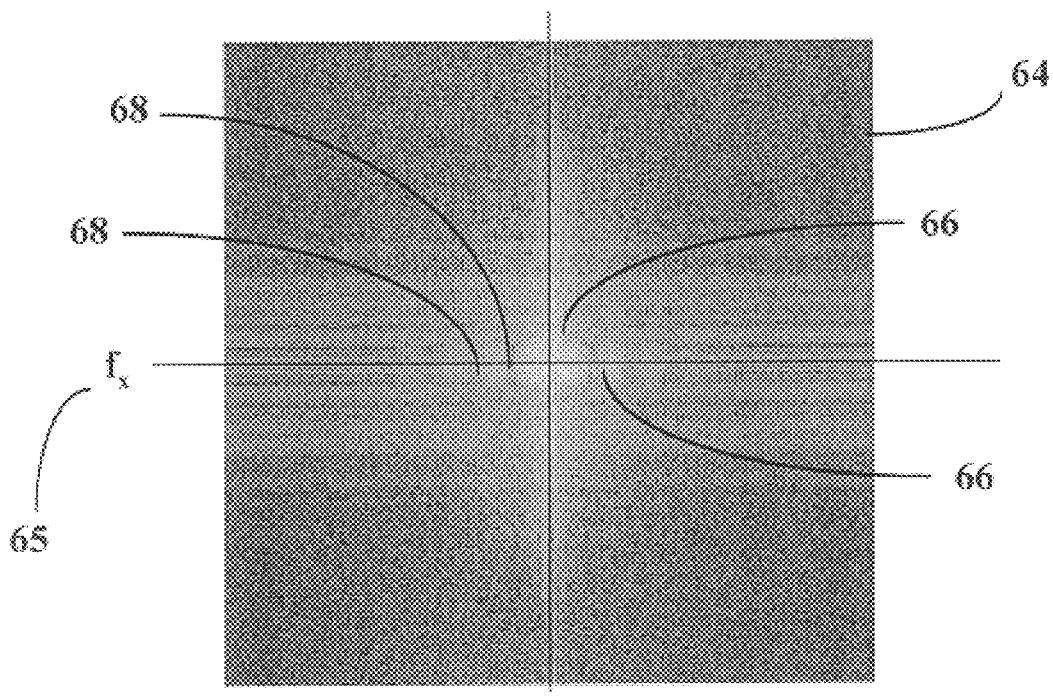
FIG. 5 is a Fourier power spectrum of a sample window.
Figure 6:
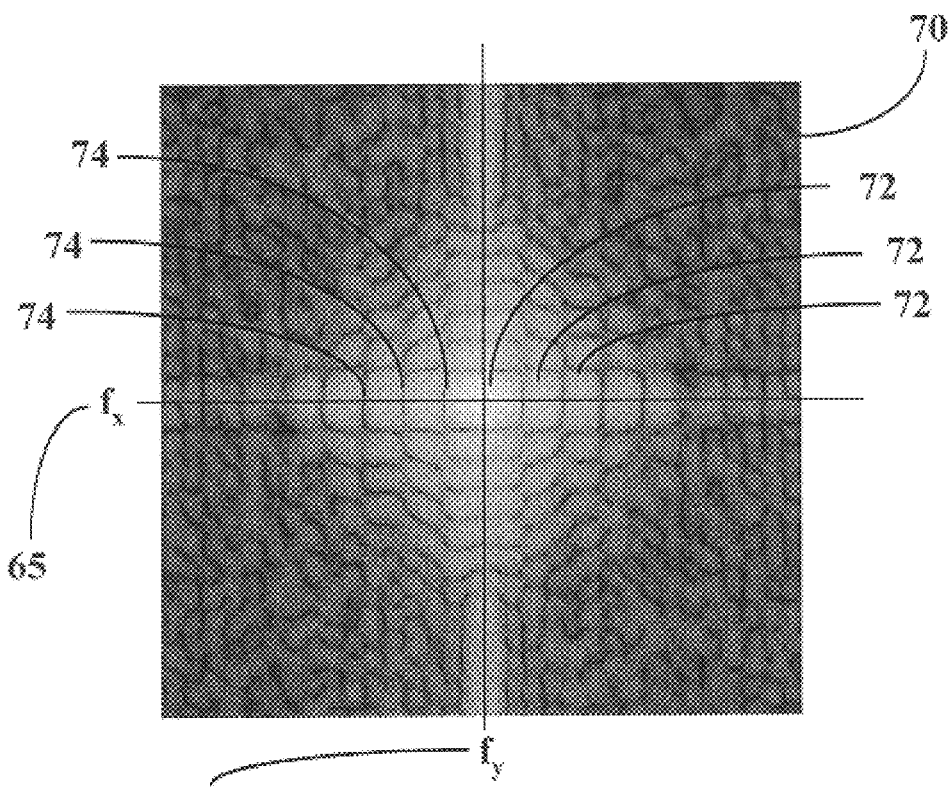
FIG. 6 is a Fourier power spectrum of a preferred sample window.
Figure 7:
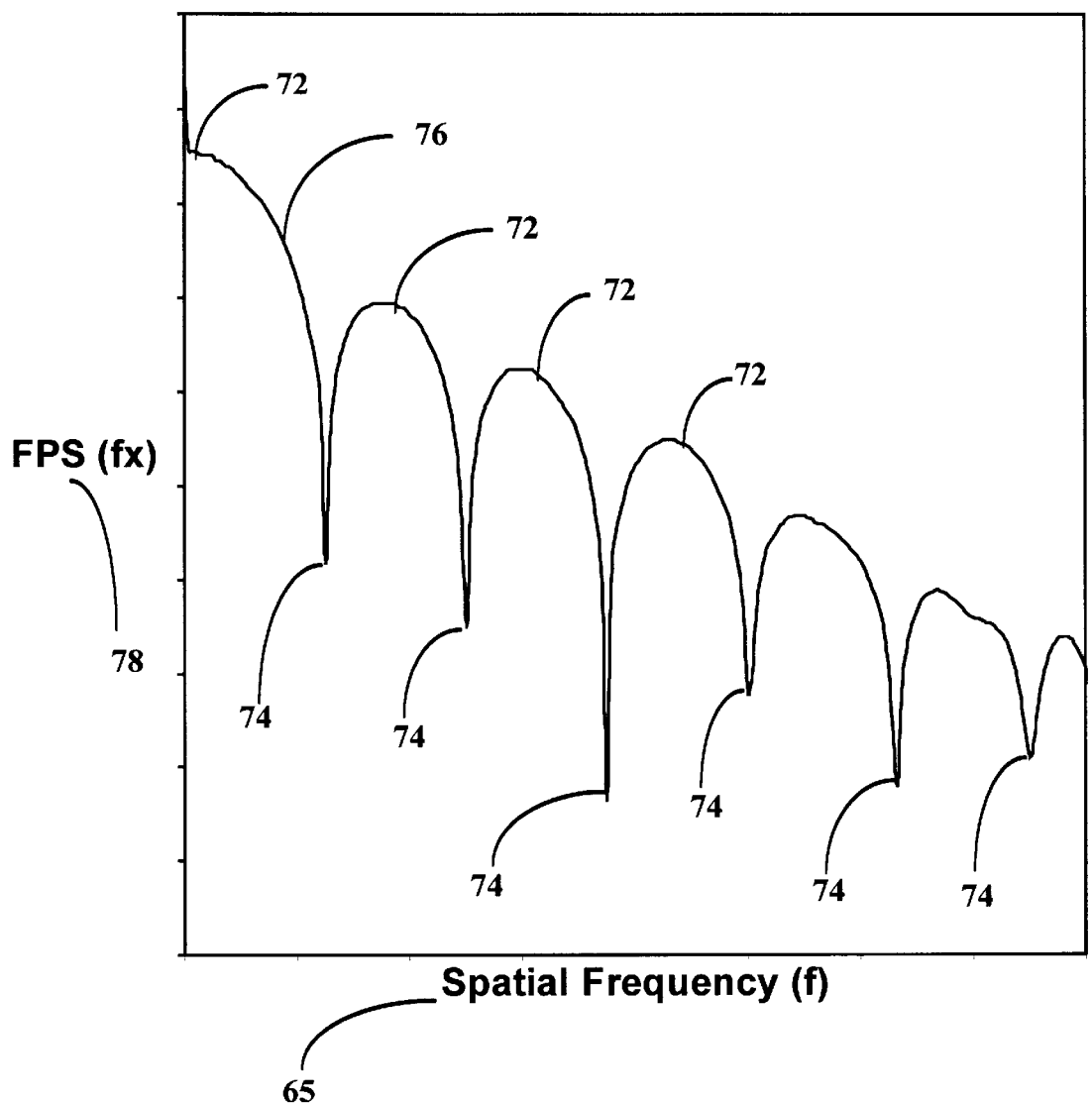
FIG. 7 is a cross-section of the Fourier power spectrum of FIG. 6.

In accordance with another preferred embodiment of the present invention, the manner in which the sample widow is chosen will substantially improve the FPS data. It will be appreciated by those skilled in the art that head structures such as those described herein, comprise a substantial number of closely spaced elements, many of which are visible in a microscopic image of the pole tip region. In keeping with the present invention, a guideline for choosing an appropriately sized sample window may comprise including a number of additional image features besides the one of interest. As shown in FIG. 4, the two-dimensional sample window 60 is chosen to be large enough for adequate FPS interpolation of P2 28 in accordance with the present invention. However, the sample widow 60 also includes additional features such as P1 26 and the magnetic shield 24. Additionally, a large sample window also includes additional image noise that will add noise power to the FPS. The FPS of sample window 60 is shown in FIG. 5 as a two-dimensional gray-scale image 64, as a function of the spatial frequencies $f_x$ 65, $f_y$ 67. While the lobes 66 and cusps 68 due to P2 are clearly visible, there is significant interference from other features present in the image. In a preferred embodiment of the present invention, an appropriately sized sample window is constructed by selecting a sample window having substantially only the region of interest present, and then extending the window in a piecewise continuous fashion. For example, referring again to FIG. 4, an initial sample window 62 is chosen which includes substantially only P2 28 and the surrounding alumina 29. The sample window is then piecewise extended or padded to the desired size by allowing the remainder of the window to adopt pixel values substantially equal to the surrounding alumina 29. Thus, the desired sample window contains only the structure of interest with little else to contribute to the FPS. Feature extraction and window padding may be carried out for a plurality of image features thereby utilizing as much of the available image information without adding noise power or interference from other features. As shown in FIG. 6, the FPS 70 of the referred sample window clearly shows a plurality of lobes 72 and cusps 74 deriving from the FPS of P2. A cross-section of the FPS 70 through $f_y=0$ is shown in FIG. 7 as curve 76. The curve 76 comprises a plurality of well-defined cusps 74 indicative of P2w 34. In accordance with the present invention, the spatial frequency interval between least two of the cusps 74 is measured to determine w with high precision. It is preferable to determine the location of the largest number of such cusps to further enhance the precision of the measurement.

Figure 8:
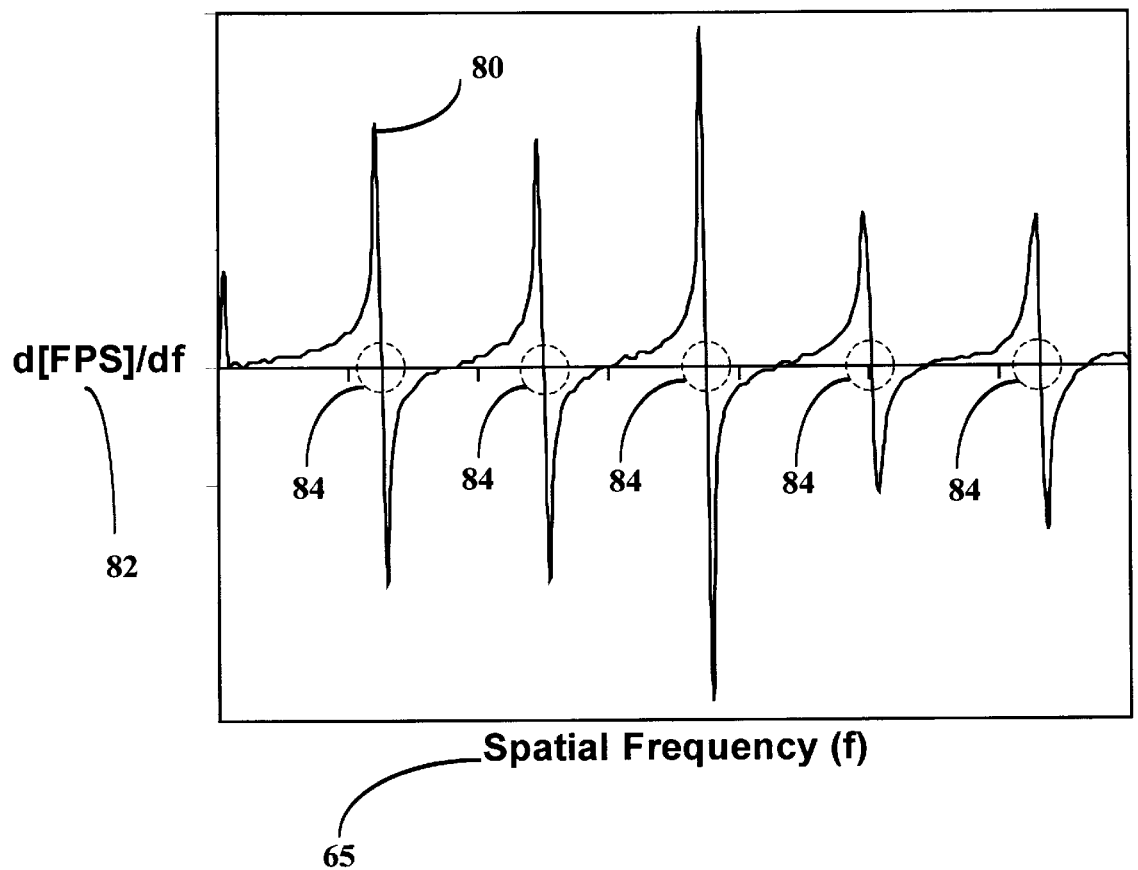
FIG. 8 illustrates a convenient method for determining the inflection points from FIG. 7.

In accordance with yet another preferred embodiment of the present invention, the derivative of I(f) or $$\frac{d(FPS)}{df}$$

displays precise zero crossings at the cusps of I(f). The zeros of of $$\frac{d(FPS)}{df}$$

allow for convenient and precise numerical determination of the cusp locations. As shown in FIG. 8, $$\frac{d(FPS)}{df}$$

82 calculated from the data of FIG. 7 is plotted as a function of spatial frequency f 65. The zero crossings 84 corresponding to the cusp positions 74 of FIG. 7 are clearly identified. Measurement of the spatial frequency intervals between the zero crossings 84 renders a precise determination w in accordance with the present invention.

Another aspect of the present invention is that its application is complementary to other image restoration or deconvolution techniques that may attempt to extract object features from noise or image system response. For example it is further advantageous to apply noise reduction techniques such as Wiener filtering or other deconvolution techniques which may further attenuate the influence of the imaging system response function prior to applying the method of the present invention.

The invention disclosed herein is particularly advantageous for optical inspection of recording heads because of the increasing demand for high-throughput automated and precise inspection techniques. As head features continue to decrease in size, the present invention will provide optical microscopy techniques with additional measurement capability to keep pace with an increasingly demanding manufacturing process. It will be appreciated that other image forming systems may be used advantageously in conjunction with the present invention. For example, critical dimension measurement with scanned probe microscopes such as Scanning Electron Microscopes (SEM), Atomic Force Microscopes (AFM) or Scanning Laser Confocal Microscopes (SLCM) can advantageously utilize the present invention. Medical imaging devices such as MRI, PET and X-ray, where precise feature measurements are desired, can also advantageously utilize the present invention. Considering the growing demand for optical inspection and imaging systems in general, the present invention represents a valuable contribution to image metrology. The present invention has been described in conjunction with preferred embodiments thereof. Many modifications and variations of the disclosed embodiments of the apparatus and method will be apparent to those of ordinary skill in the art. The foregoing disclosure and the following claims are intended to cover all such modifications and variations.

What is claimed is:

1. A method for measuring a feature of an object comprising:
   forming an image of the object;
   selecting a sample of the image comprising the feature to be measured;
   calculating a Fourier power spectrum of the said sample of the image;
   identifying two extremal points of the Fourier power spectrum;
   determining a spatial frequency interval between the extremal points; and
   calculating a dimension of the feature based on said spatial frequency interval.

2. The method of claim 1, wherein said sample of the image is larger than the square of the dimension of the feature.

3. The method of claim 1, further comprising piecewise continuing said sample comprising the feature to be measured.

4. The method of claim 1, wherein determining said spatial frequency interval comprises calculating a derivative of said Fourier power spectrum.

5. The method of claim 1, further comprising suppressing image noise prior to selecting said sample of the image.

6. The method of claim 1, further comprising deconvolving the image prior to selecting said sample of the image.

7. An apparatus for image metrology comprising:

an image forming system;

a image acquisition system connected to receive an image from said image forming system; and an image processor connected to receive image data from said image acquisition system for measuring a predetermined feature of an image, said image processor selecting a sample of said image comprising the predetermined feature, calculating a Fourier power spectrum of said sample and identifying at least two cusps in said Fourier power spectrum.

8. The apparatus of claim 7, wherein said cusps are identified by calculating a derivative of said Fourier power spectrum.

9. The apparatus of claim 7, wherein said processor further measures a spatial frequency interval between said two cusps of the Fourier power spectrum.

10. The apparatus of claim 9, wherein said processor determines a dimension of the predetermined image feature using said spatial frequency interval.

11. The apparatus of claim 7, wherein said image forming system comprises an optical microscope.

12. The apparatus of claim 11, wherein said optical microscope operates using broad band illumination.

13. The apparatus of claim 11, wherein said optical microscope has a non-zero modulation transfer function spanning a predefined spatial frequency interval.

14. The apparatus of claim 7, wherein said image forming system comprises a scanning probe microscope.

15. A system for measuring magnetic recording head dimensions comprising:

a microscope for forming an image of a magnetic recording head;

a camera connected to said microscope for recording said image; and a processor connected to said camera for receiving said image data, said processor selecting a sample of said image comprising a predetermined feature to be measured, said processor further calculating a Fourier power spectrum of said sample and identifying cusps in said Fourier power spectrum.

16. The system of claim 15, wherein said processor identifies said cusps by calculating a derivative of said Fourier power spectrum.

17. The system of claim 15, wherein said processor further measures a spatial frequency interval between said two cusps of the Fourier power spectrum.

18. The system of claim 17, wherein said processor determines a dimension of the predetermined image feature using said spatial frequency interval.

19. The system of claim 11, wherein said microscope has a non-zero modulation transfer function spanning a predefined spatial frequency interval.

20. The system of claim 15, wherein said image forming system comprises a scanning probe microscope.

* * * * *